(12) United States Patent
Aydemir et al.

(10) Patent No.: US 7,911,960 B1
(45) Date of Patent: Mar. 22, 2011

(54) DELAYED-START METHOD FOR MINIMIZING INTERNAL SWITCH CONGESTION

(75) Inventors: Metin Aydemir, Durham, NC (US); Marco C. Heddes, Raleigh, NC (US); Clark Debs Jeffries, Durham, NC (US); Steven Paul Woolet, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/373,837

(22) Filed: Aug. 13, 1999

(51) Int. Cl.
*H04L 1/00* (2006.01)
*H04L 12/26* (2006.01)
*H04J 3/14* (2006.01)
*G08C 15/00* (2006.01)
*G06F 11/00* (2006.01)

(52) U.S. Cl. ........ 370/236; 370/230; 370/364; 370/395; 370/412

(58) Field of Classification Search .......... 370/229–236, 370/249, 395–418, 428, 429, 252–351, 364–389; 709/217–224
See application file for complete search history.

(56) References Cited

U.S. PATENT DOCUMENTS

| | | | |
|---|---|---|---|
| 4,472,801 A | 9/1984 | Huang | 370/411 |
| 5,050,161 A * | 9/1991 | Golestani | 370/230 |
| 5,367,520 A * | 11/1994 | Cordell | 370/395.71 |
| 5,402,416 A | 3/1995 | Cieslak et al. | 370/236 |
| 5,493,566 A * | 2/1996 | Ljungberg et al. | 370/231 |
| 5,570,348 A | 10/1996 | Holden | 370/236 |
| 5,732,085 A | 3/1998 | Kim et al. | 370/398 |
| 5,742,606 A | 4/1998 | Iliadis et al. | 370/413 |
| 5,748,629 A | 5/1998 | Caldara et al. | 370/389 |
| 5,768,257 A | 6/1998 | Khacherian et al. | 370/229 |
| 5,774,453 A * | 6/1998 | Fukano et al. | 370/231 |
| 5,787,071 A * | 7/1998 | Basso et al. | 370/231 |
| 5,790,522 A * | 8/1998 | Fichou et al. | 370/236 |
| 5,790,770 A | 8/1998 | McClure et al. | 395/200 |
| 5,793,436 A * | 8/1998 | Kim | 348/447 |
| 5,809,021 A * | 9/1998 | Diaz et al. | 370/364 |
| 6,198,725 B1* | 3/2001 | Constantin et al. | 370/395.21 |
| 6,408,005 B1* | 6/2002 | Fan et al. | 370/412 |
| 6,442,139 B1* | 8/2002 | Hosein | 370/236 |
| 6,563,792 B1* | 5/2003 | Chang et al. | 370/235.1 |
| 6,711,133 B1* | 3/2004 | Suetsugu | 370/236.1 |

* cited by examiner

*Primary Examiner* — Man Phan
(74) *Attorney, Agent, or Firm* — Dillon & Yudell LLP (57) ABSTRACT

A data flow control method and system within a data switch. The data switch includes a plurality of input sections each having an associated input buffer and each transmitting data to an output section. In response to a detection of congestion within the output section, data transmissions from the plurality of input sections to the output section are paused. Input buffer occupancies of each of the input sections are then determined. Thereafter, and in response to a backpressure relief signal, the restart of said data transmission from each of the input sections to the output section is delayed in inverse proportion to each of the determined input buffer occupancies.

18 Claims, 5 Drawing Sheets

DELAYED-START METHOD FOR MINIMIZING INTERNAL SWITCH CONGESTION

BACKGROUND OF THE INVENTION

1. Technical Field

The present invention relates in general to an improved method and system for managing communications networks. In particular, the present invention relates to a method and system for providing enhanced data flow control within a telecommunications switch. More particularly, the present invention relates to utilizing a backpressure signal to initiate balancing of buffer occupancies among input sections of a data switch. Still more particularly, the present invention provides a method and system for computing delay intervals that vary inversely with input buffer occupancy, and delaying resumption of data transmission from the input buffers in accordance with the computed delay intervals, such that internal switch congestion may be minimized.

2. Description of the Related Art

Switching technology is utilized to make current telecommunications systems faster and more flexible, while at the same time facilitating migration to faster networks. The ever increasing performance and speed demands by users has resulted in many networks experiencing continual slowdowns and bandwidth shortages. Switching directs network traffic in a very efficient manner—sending information directly from the port of origin to only the destination port. In this manner, switching technology increases network performance, enhances flexibility and eases additions or rearrangements to a network. Switching provides in part, a means for managing network traffic by reducing transmission media sharing. Network traffic is confined to the segment for which it is destined, be it a server, workgroup, or individual end-station.

Figure 1:
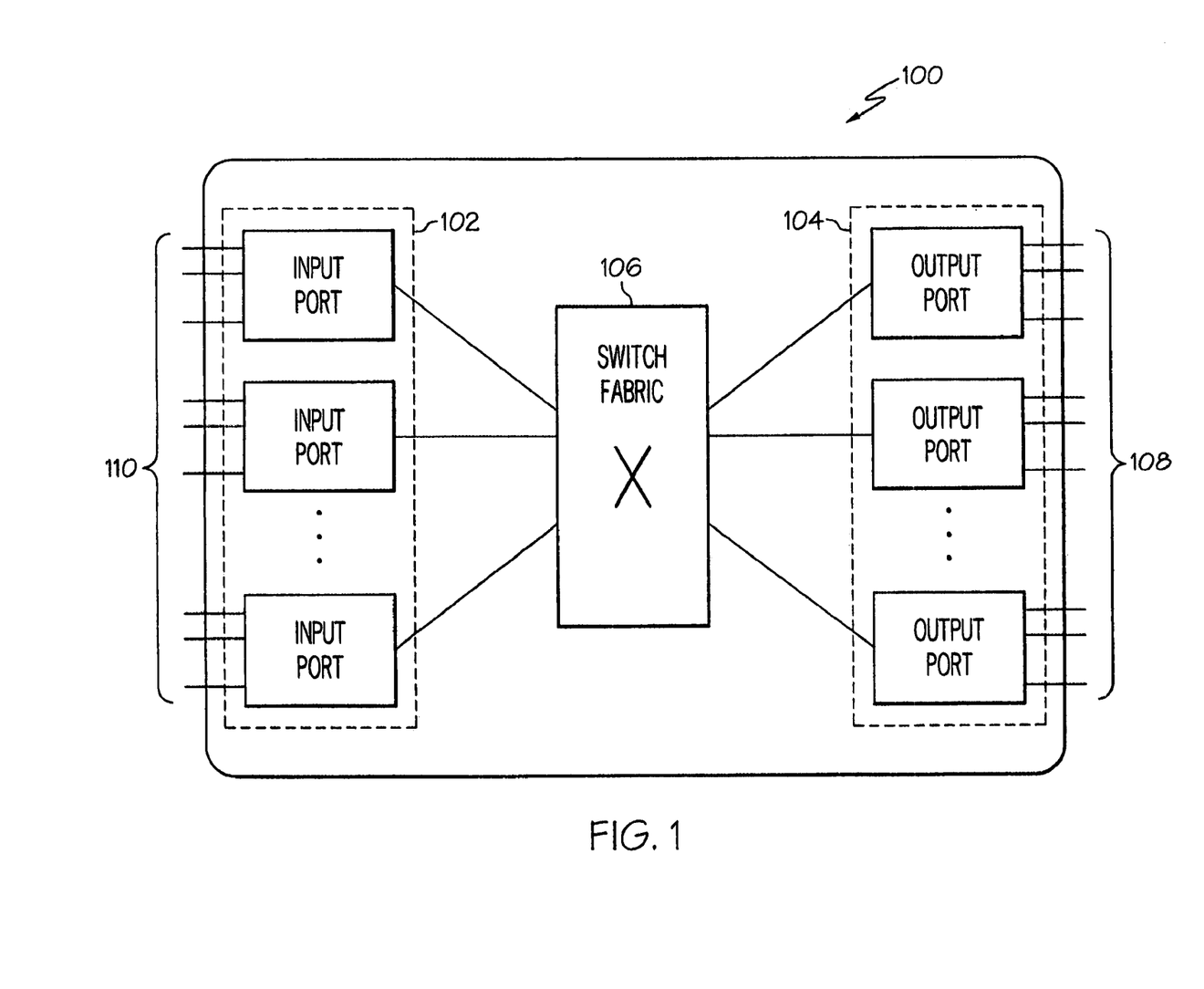
FIG. 1 illustrates a conventional data packet switch in which the method and system of the present invention may be implemented.

Packet switching is a technique utilized in data networks such as Ethernet LANs and ATM systems. FIG. 1 illustrates the architecture of a conventional generic output-queueing packet switch. In conventional switches such as switch 100 of FIG. 1, the data storage capacity of input sections 102 is limited to the capacity of input buffers which reside within each of input sections 102. Several output sections 104, serve to accept and deliver data from switching fabric 106 to a destination node external to switch 100. Data throughput within switch 100 and particularly through switching fabric 106 is typically much higher than the rate at which data actually arrives at or is delivered from switch 100. Therefore, a queueing method must be employed within packet switches such as switch 100. Such a queueing method may be referred to as "buffering" and will be so referred hereinbelow. Buffering requires both buffers (i.e. data storage elements) and buffer control. Buffer control provides supervision within the switch as to which buffers will release a unit of data from a buffer at any given time.

Packet switches such as switch 100 typically include buffering implemented in input sections 102, output sections 104, and switching fabric 106. In packet switches characterized as "output queuing" packet switches, the majority of buffering capacity resides in the output sections. The buffering capacity in switching fabric and input sections are limited to handling congestion in switching fabric output ports (SFOPs) such as SFOPs 108. The SFOP congestion typically occurs when a large number of switching fabric input ports (SFIPs), such as SFIPs 110, are sending packets to a particular SFOP. If overloaded, the output section will respond by delivering a backpressure signal to the switching fabric. This backpressure signal reports the congested condition in the output section and instructs the switching fabric to stop sending packets to the affected output section. The result is an accumulation of packets in the switching fabric itself.

The SFOP congestion first results in queue buildup within switching fabric 106. However, if switching fabric buffers are in danger of overflow, switching fabric 106 applies backpressure to input sections 102 by delivering a backpressure signal to input sections 102. The backpressure signal from switching fabric 106 may be one of two types: (1) individual SFOP congestion backpressure—an SFOP gets congested and queued packets reach a pre-defined threshold; or, (2) master switching fabric congestion backpressure—the total buffer space of the switching fabric is congested (i.e. total packets queued reach a given threshold). The reaction of the input section to receiving a backpressure signal from the switching fabric will depend on the type of signal sent. When an individual SFOP backpressure signal is applied, the input section will stop sending packets to that SFOP. The input section will continue to send packets to SFOPs that are not applying individual SFOP backpressure. When a master SFOP backpressure signal is applied, the input section stops sending any packets to the switching fabric. When the input section buffering capacity becomes completely consumed, the only option available may be to discard packets.

One possible alternative approach of addressing the problem of overloaded input queues involves embedding input buffer occupancy feedback into flow control methods. In this manner, an input section provides information to upstream network nodes regarding its current buffer occupancy level and how the flow rate should be adjusted. However, due to the rapidly increasing size and complexity of packet switched networks, this approach would require global knowledge that would be very difficult to acquire.

It can therefore be appreciated that a need exists for a method and system for monitoring input buffer occupancy levels in a packet switch and utilizing this information to avoid congestion within input buffers.

SUMMARY OF THE INVENTION

It is therefore an object of the invention to provide an improved method and system for managing communications networks.

It is another object of the invention to provide a method and system for providing enhanced data flow control and congestion control within a telecommunications switch.

It is still another object of the invention to utilize a backpressure signal from switch output buffers to initiate balancing of buffer occupancy among input sections of a data switch, such that buffer overflow and the resulting loss of data packets may be prevented.

It is a further object of the invention to dynamically compute delay intervals that vary inversely with input buffer occupancy, and delay resumption of data transmission from the input buffers in accordance with the computed delay intervals, such that internal switch congestion may be minimized.

The above and other objects are achieved as is now described. A data flow control method and system within a data switch are disclosed. The data switch includes a plurality of input sections each having an associated input buffer and each transmitting data to an output section. In response to a detection of congestion within the output section or detection of congestion in a switching fabric output port, data transmissions from the plurality of input sections to the output section are paused. Input buffer occupancies of each of said input sections are then determined. Thereafter, and in response to a backpressure relief signal, the restart of said data transmission from each of the input sections to the output section is delayed in inverse proportion to each of the determined input buffer occupancies.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

The present invention introduces a new method and system for monitoring and balancing occupancy levels among packet switch input buffers (i.e. the buffers that reside in the input sections 102 of switch 100). The monitoring process is performed utilizing switch intelligence functions. Internal switch intelligence may be utilized to determine the level of occupancy of any given switch buffer and, in accordance with the method and system of the present invention, this information is evaluated at the occurrence of internal switch congestion to permit balancing among the input buffers as explained in greater detail below. This balancing substantially decreases the likelihood of packet discards that result when input buffers become full.

Figure 2:
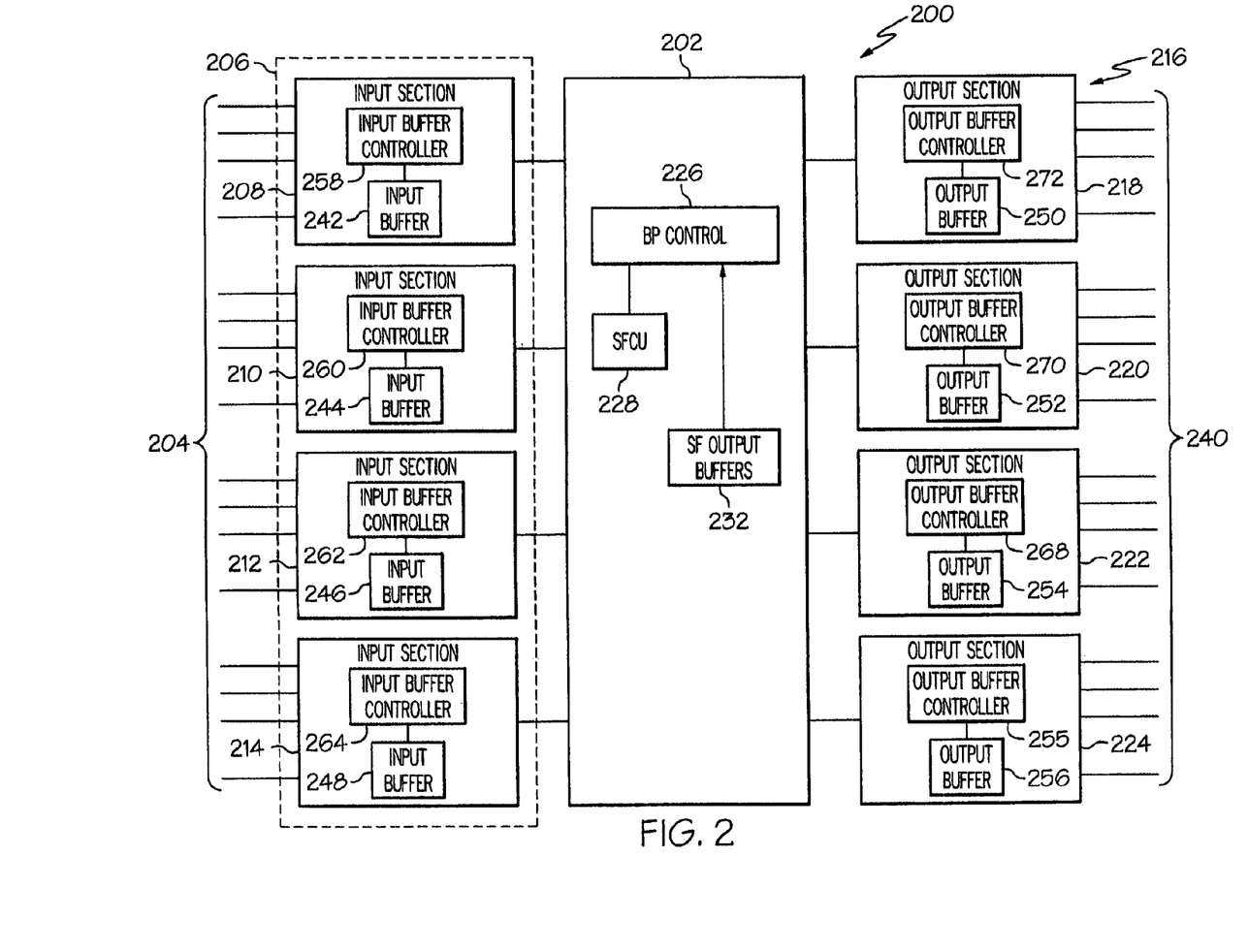
FIG. 2 is a block diagram depicting devices and functional entities associated with a system for relieving input buffer congestion within a packet switch.

Turning now to the figures and in particular, with reference to FIG. 2, there is depicted a block diagram of a delayed-start system 200 that may be implemented within a packet switch in accordance with the teachings of the present invention. As illustrated in FIG. 2, delayed-start system 200 is comprised of functional entities and devices included within a conventional packet switch including a plurality of inputs sections 206, input ports 204, switching fabric 202, a plurality of output sections 216, and output ports 240. Data is received by delayed-start system 200 into input ports 204 from external telecommunications nodes. Input buffers 242, 244, 246, and 248, within input sections 208, 210, 212, and 214 respectively, serve as queues for incoming data packets. A packet switch is typically designed such that its internal throughput capacity through its switching fabric is much higher than the input throughput through its input ports or the output throughput through its output ports. Switching fabric output buffers 232 are therefore provided to buffer data packets destined for one of the output sections during heavy or bursty traffic conditions.

The present invention addresses the problems caused by overload in buffer occupancy levels among input buffers such as input buffers 242, 244, 246 and 248. Imbalances among input buffers may cause an overloaded condition to occur in some input buffers and thus result in data packets being discarded and thus requiring retransmission. Overload within input buffers may also result in excess traffic congestion being propogated upstream to other nodes in the network. In order to prevent an excessive occurrence of packet loss, the present invention proposes a method and system that take advantage of buffer occupancy imbalances among multiple input sections. The correction of buffer imbalances effectively allows a greater number of packets to be stored within the input sections of the packet switch. Therefore, the present invention proposes a method and system for "prioritizing" the order in which input sections will resume transmission of packets to the switching fabric following the lifting of a backpressure signal. Paused input sections which are critically loaded (in danger of having to discard further incoming packets) are provided time priority to immediately resume transmission upon a signal from the switching fabric to resume transmission. This temporary prioritization of such congested input sections results in increased buffering in non-congested input sections. In this manner, the input buffer occupancy among all input sections is balanced.

Returning to FIG. 2, a switching fabric control unit (SFCU) 228 performs internal switch intelligence functions as well as coordinating data transfer from input to output ports. Such coordination is necessary such that data packets may be correctly routed from a particular input port among input ports 204 to the appropriate output port. Each packet contains the identity of the destination output section. This information is utilized by SFCU 228 to determine the appropriate SFOP.

When one or more of output sections 218, 220, 222, or 224 becomes congested, the associated buffer controller delivers a congestion warning signal to backpressure control unit 226. For example, if output section 218 becomes overloaded, output controller 272 will deliver a congestion warning to backpressure control unit 226 indicating that output section 218 is congested. Backpressure control unit 226 will stop transmission of packets to the output section issuing the backpressure signal. Backpressure control unit 226 may also generate and deliver a backpressure signal to one or more of input sections 208, 210, 212, and 214. In a preferred embodiment of the present invention, the backpressure signal is independently generated solely based on the congestion status of the SFOP. Another source of backpressure signal generation is when traffic from multiple input sections become concentrated in a given output section. This may lead to congestion within the SFOP and a packet buildup in SFOP buffers in the switching fabric. In such a case, and when SFOP buffers reach a certain threshold occupancy level, backpressure control unit 226 will generate and deliver a backpressure signal to input sections 208, 210, 212, and 214. This type of backpressure is therefore individualized on a per switching fabric output port basis.

The backpressure signal is delivered to all input sections 208, 210, 212, and 214, which respond by temporarily halting transmission of packets to the congested output section specified in the backpressure signal itself. Only when the backpressure signal is removed (or a signal indicating such removal is received) are input sections 208, 210, 212, and 214 free to resume transmission to the previously congested output section. The delayed-start method of the present invention provides a particularized set of responses that are activated at the backpressure removal epoch.

Figure 3:
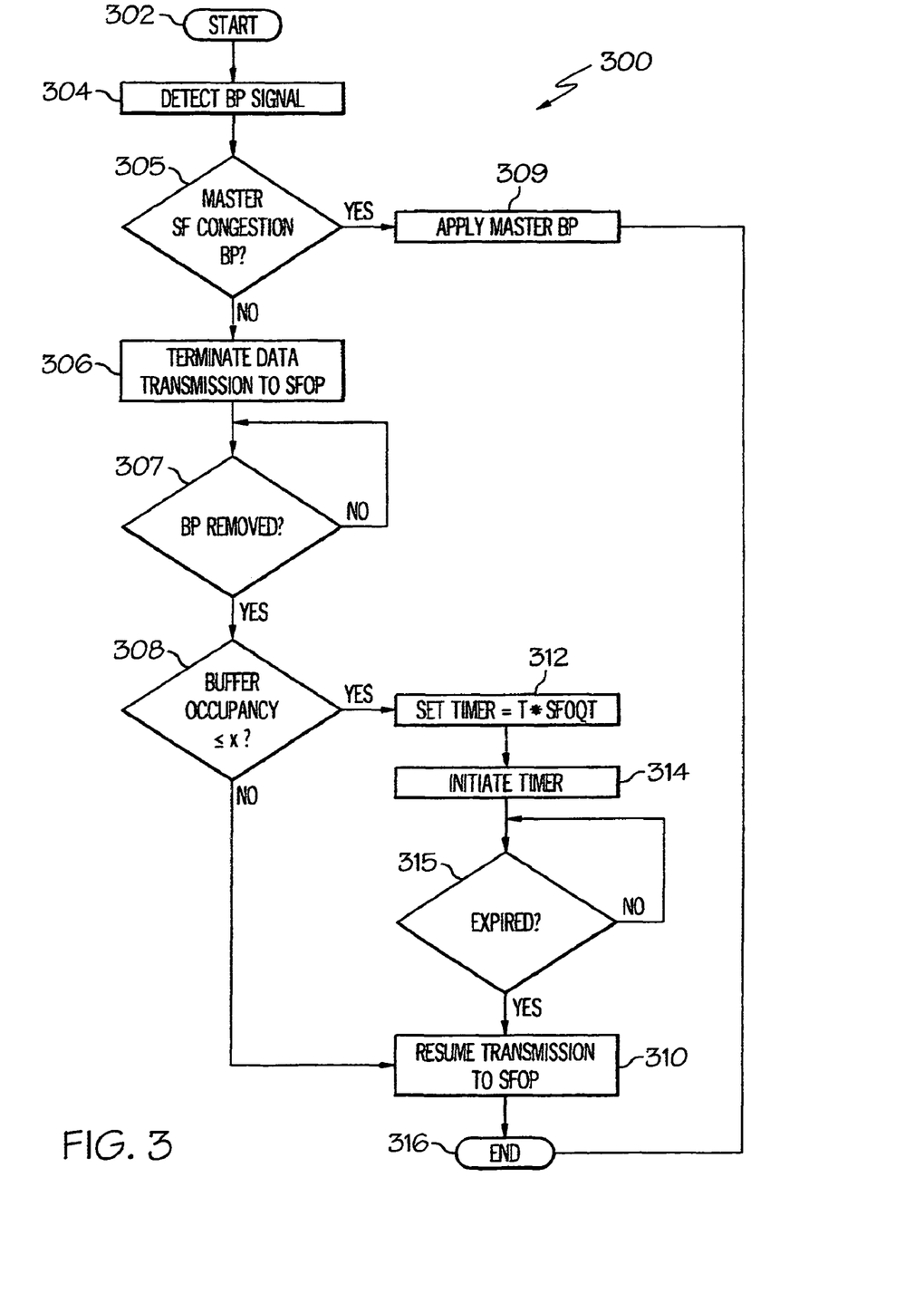
FIG. 3 is a high level logic diagram illustrating a methodology for maintaining a relative balance among input buffer occupancies in accordance with the teachings of the present invention.

With reference now to FIG. 3, there is depicted a series of steps comprising a delayed-start methodology 300 for addressing internal switch congestion in accordance with the teachings of the present invention. Delayed-start method 300 of FIG. 3 addresses such congestion by utilizing a backpressure signal as the opportunity to provide relatively greater transmission opportunity to congested input sections. As shown in FIG. 3, delayed-start method 300 commences at step 302 and proceeds to step 304 which depicts a backpressure signal having been detected and received by an input section controller from the switching fabric. Although not explicitly illustrated at step 304, the backpressure signal serves as an indication to the input section that at least one buffer within an output section, or within the switch fabric itself, has become congested. The purpose of the backpressure signal is thus to alert the input section of the congested output buffer status and to command that input section to terminate data packet transfer to the congested output section. The utilization of backpressure signals for such purposes is well known in the art and further explanation of general usage and operation of backpressure signals within data switches is unnecessary.

As illustrated at step 306, all input section controllers that receive an individual SFOP congestion backpressure signal (i.e. specifying the identity of one or more congested SFOPs), respond accordingly by terminating transmission of data packets to all output sections identified as being congested by the backpressure signal at step 304.

A preferred embodiment of the present invention may be advantageously applied in a context in which the backpressure control unit within a packet switch provides two types of backpressure signals. The first is an individual SFOP congestion backpressure signal in which the identity of the congested SFOP or SFOPs are provided. The second is a master SFOP congestion backpressure signal which indicates that the entire switching fabric is congested. As illustrated at steps 305, 309, and 316, the delayed-start method is not applicable when the master SF congestion backpressure is experienced. If the backpressure signal detected as depicted at step 304 specifies a master SF congestion backpressure, then at step 305, the input section controller will detect this condition. In this case, the precise identity of the congested output buffer, the input section controller will respond by terminating all transmission from the input section to the switching fabric.

The method proceeds to inquiry step 307 which depicts the pause of data transmission from input sections to the switching fabric while the backpressure signal is active. The backpressure signal can be an electrical signal in which high or low levels denote the presence or absence of backpressure. Alternatively, the backpressure signal may be a single event which sets the backpressure condition as to an input section and which persists until a "backpressure remove" signal is received. The operational agreement between input sections and switching fabric requires that the input section stops transmission to the SFOP or the SF (depending on the type of backpressure) when backpressure is active.

Once the backpressure signal is removed, and as illustrated at step 308, the input section controllers that received the backpressure signal at step 306 determine the occupancy levels of each paused input buffer. Input buffer controllers 258, 260, 262, and 264 of FIG. 2 may be utilized as the internal switch intelligence that performs the evaluation at step 308. The determination conducted at step 308 is performed on each of the affected input buffers individually. If, as illustrated by steps 308 and 312, the buffer occupancy for a given input buffer exceeds a given predetermined threshold, a non-zero delay interval is assigned to that buffer. If, as depicted by steps 308 and 310, the buffer occupancy for the input buffer is less than or equal to the threshold value, a delay interval of zero ("no delay") is assigned to that buffer. Thus the buffer will resume transmission to the switching fabric immediately following removal of the backpressure signal.

The embodiment depicted and explained in FIG. 3, provides for either a "delay" or "no delay" response to a release of backpressure. Consistent with the spirit and scope of the present invention, multiple delay values may also be utilized. In such an embodiment, a plurality of occupancy thresholds (x1, x2, x3, etc.) may be utilized at step 308. In this case, the timer delay depicted at step 312 is computed based on the relative occupancy of a given buffer. For example, assuming $x1 > x2 > x3$, and $T1 < T2$, if $0 <$ buffer occupancy $< x1 \Rightarrow$ set timer to T1;
  if $x1 <$ buffer occupancy $< x2 \Rightarrow$ set timer to T2;
  if $x2 <$ buffer occupancy $< x3 \Rightarrow$ proceed to step 310.

The timer set in accordance with the delay interval at step 312 is initiated upon detection of backpressure removal as illustrated at step 314. Finally, as illustrated at step 315, data transmission from a delayed input buffer does not resume until the timer has expired. In this manner highly congested input buffers will begin transmitting sooner than uncongested buffers resulting in balancing of the buffer occupancies across the input sections.

Figure 4A:
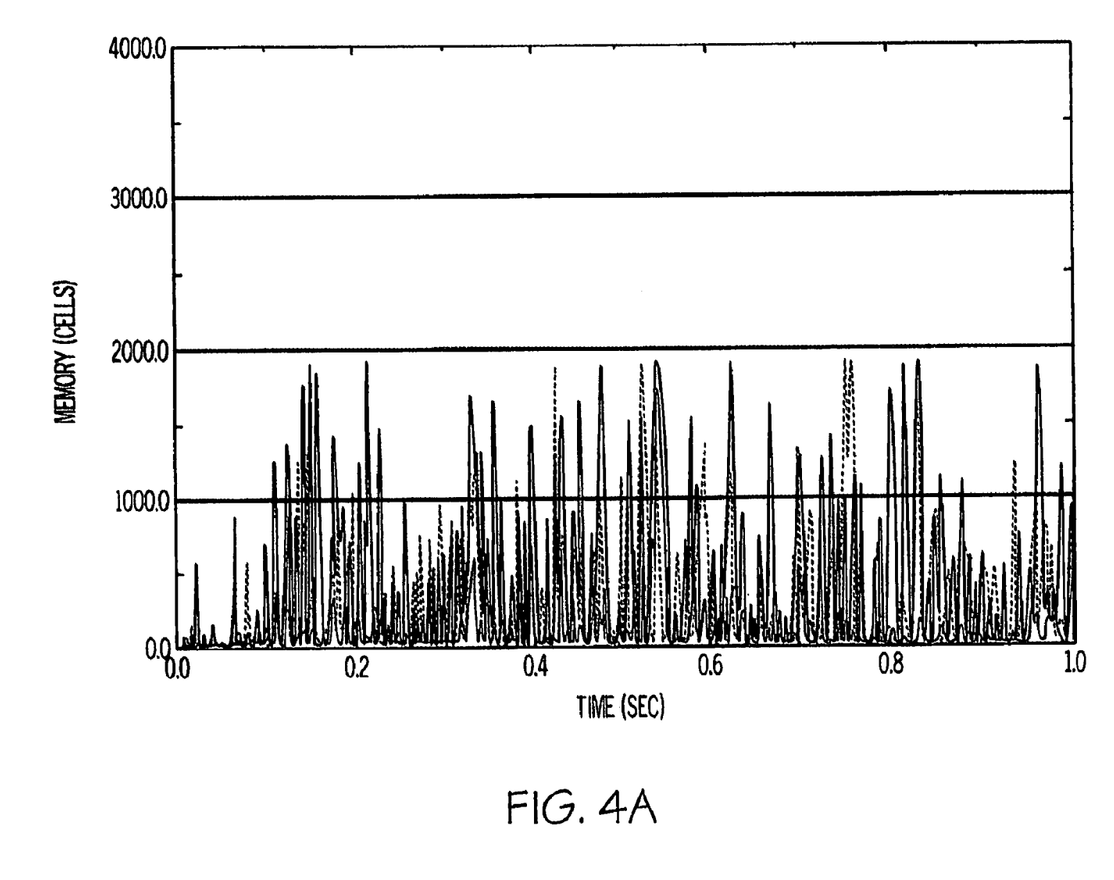
FIG. 4 depicts a simulation result showing balancing of input buffer occupancies after a backpressure signal is received in accordance with the teachings of the present invention.
Figure 4B:
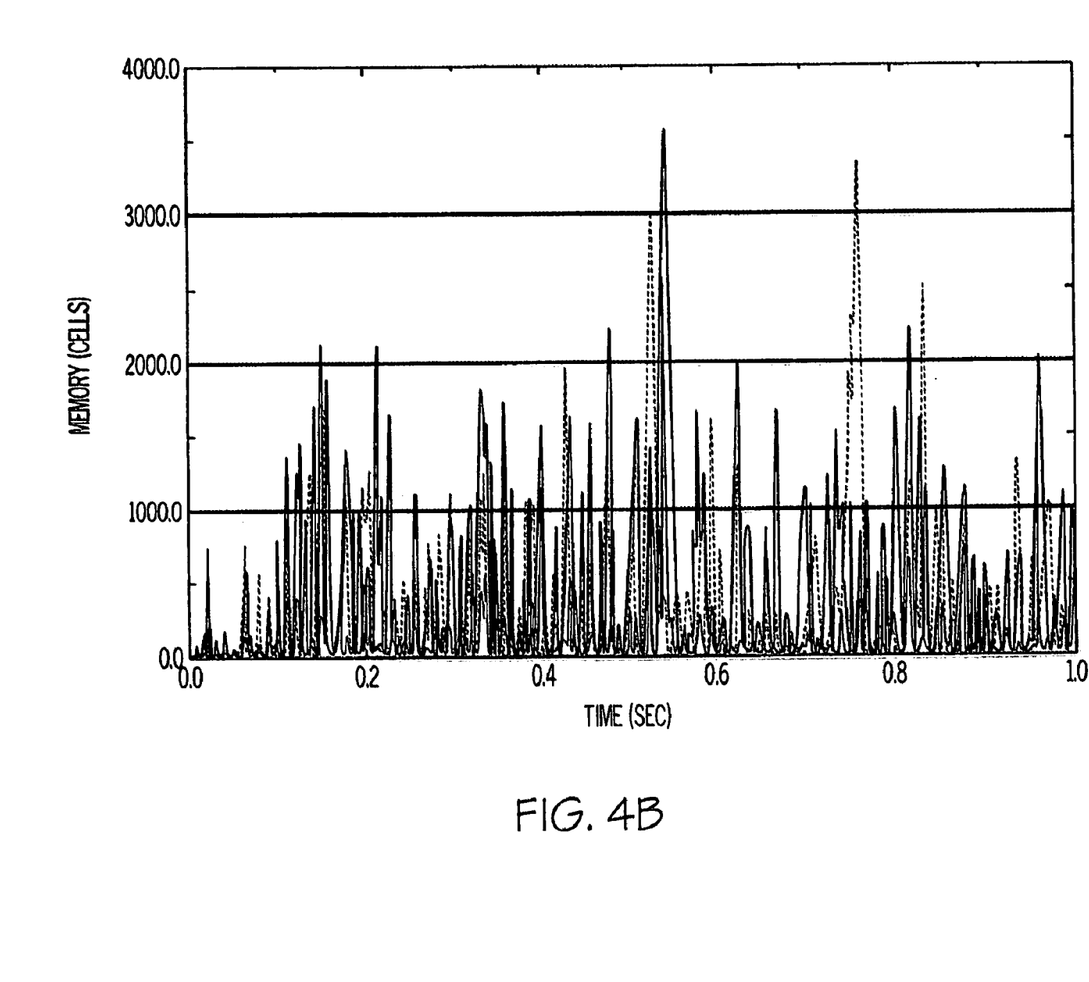

Turning now to FIGS. 4A and 4B, which depict simulation results showing balancing of input buffer occupancies after a backpressure signal is received in accordance with the teachings of the present invention. The plot results in FIG. 4A show the cell buffer occupancy within input section buffers, such as buffers 242, 244, 246, and 248 of FIG. 2, during and following an occurrence of congestion in a delayed-start system. FIG. 4B illustrates the cell buffer occupancy for the same input section buffers, but without use of the delayed start method.

It is important to note that, while the present invention has been, and will continue to be, described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links.

Preferred implementations of the invention include implementations as a computer system programmed to execute the method or methods described herein, and as a program product. According to the computer system implementation, sets of instructions for executing the method and methods are resident in RAM of one or more computer systems configured generally as described above. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the present invention as depicted in FIG. 3, can be accomplished with a computer-aided device. In such a method, data stored in a memory unit of a data-processing system such as a data-processing system, can represent steps in a method for implementing a preferred embodiment of the present invention.

While the invention has been particularly shown as described with reference to a preferred embodiment, it will be understood by those skilled in the art that various changes in form and detail may be made therein without departing from the spirit and scope of the invention. Those skilled in the art will appreciate and understand the extensions necessary to apply the method and system of the present invention to a variety of switched networks such as ATM or Ethernet LANs. It is therefore contemplated that such modifications can be made without departing from the spirit or scope of the present invention as defined in the appended claims.

What is claimed is:

1. A data flow control method within a data switch having a plurality of input sections each including a respective input buffer from which that input section transmits data to an output section through a switching fabric, said data flow control method comprising the steps of:
    defining a plurality of occupancy levels, including a high level and a low level, each uniquely corresponding to a range of input buffer occupancy values;
    pausing data transmission from said plurality of input sections to said output section in response to a detection of congestion within said switching fabric or within said output section;
    determining input buffer occupancy of the input buffer of each of said plurality of input sections during said pause;
    computing a delay interval based upon said input buffer occupancy; and
    delaying restart of data transmission from said plurality of input sections to said output section in accordance with said computed delay interval.

2. The data flow control method of claim 1, wherein said data switch further includes an output buffer within said output section and the switching fabric routes data from said input section to said output section, and wherein said step of pausing data transmission from said input section is preceded by the steps of:
    detecting a congested condition within said output buffer; and
    in response to said detection of a congested condition within an output buffer, generating a backpressure signal within said switching fabric.

3. The data flow control method of claim 2, wherein said step of detecting a congested condition within said output buffer comprises detecting a backpressure signal from said switching fabric.

4. The data flow control method of claim 3, wherein said step of pausing data transmission is initiated in response to an input section among the plurality of input sections receiving said backpressure signal.

5. The data flow control method of claim 2, wherein said detection of congestion within said output buffer comprises the step of detecting a high level of occupancy within said output buffer.

6. The data flow control method of claim 5, further comprising the steps of:
    monitoring said output buffer for an indication of congestion;
    detecting an indication of congestion within said output buffer;
    generating a congestion indication signal in response to said step of detecting an indication of congestion;
    delivering said congestion indication signal from said switching fabric to an input section among the plurality of input sections; and
    pausing data transmission from said input section to said output section in response to said delivery of said congestion indication signal.

7. The data flow control method of claim 1, wherein the duration of said computed delay interval varies inversely with said determined input buffer occupancy.

8. The data flow control method of claim 1, wherein said step of determining input buffer occupancies during said pause comprises the steps of:
    reading an exact input buffer occupancy value for each of said input sections; and
    in accordance with said occupancy level definitions, assigning one of said occupancy levels to each of said input sections in response to said step of reading an exact input section buffer occupancy value.

9. The data flow control method of claim 1, wherein said data switch further comprises an intelligent control device, and wherein said step of determining input buffer occupancies further comprises the steps of:
    in a periodic manner within said intelligent control device:
        reading an input buffer occupancy value for each of said plurality of input sections;
        associating each of said input section buffer occupancy values with a buffer occupancy level; and
        assigning said occupancy levels to corresponding input sections.

10. A data flow control system within a data switch having a plurality of input sections each including a respective input buffer from which that input section transmits data to an output section through a switching fabric, said data flow control system comprising:
    means for defining a plurality of occupancy levels, including a high level and a low level, each uniquely corresponding to a range of input buffer occupancy values;
    means for pausing data transmission from said plurality of input sections to said output section in response to a detection of congestion within said switching fabric or within said output section;
    means for determining input buffer occupancy of the input buffer of each of said plurality of input sections during said pause; and
    means for computing a delay interval based upon said determined input buffer occupancy and for delaying restart of data transmission from said plurality of input sections to said output section in accordance with said computed delay interval.

11. The data flow control system of claim 10, wherein said data switch further includes an output buffer within said output section and the switching fabric routes data from said input section to said output section, and wherein said means for pausing data transmission from said input section further comprises:
    means for detecting a congested condition within said output buffer; and
    means for generating a backpressure signal within said switching fabric in response to detecting a congested condition within an output buffer.

12. The data flow control system of claim 11, wherein said means for detecting a congested condition within said output buffer comprises means for detecting a backpressure signal from said switching fabric.

13. The data flow control system of claim 12, wherein said means for pausing data transmission is initiated in response to an input section among the plurality of input sections receiving said backpressure signal.

14. The data flow control system of claim 11, wherein said means for detecting congestion within said output buffer comprises means for detecting a high level of occupancy within said output buffer.

15. The data flow control system of claim 14, further comprising:
- means for monitoring said output buffer for an indication of congestion;
- means for detecting an indication of congestion within said output buffer;
- means for generating a congestion indication signal in response to detecting an indication of congestion;
- means for delivering said congestion indication signal from said switching fabric to an input section among the plurality of input sections; and
- means for pausing data transmission from said input section to said output section in response to delivering said congestion indication signal.

16. The data flow control system of claim 10, wherein the duration of said computed delay interval varies inversely with said determined input buffer occupancy.

17. The data flow control system of claim 10, wherein said means for determining input buffer occupancies during said pause comprises:
- means for reading an exact input buffer occupancy value for each of said input sections; and
- means for assigning one of said occupancy levels to each of said input sections in accordance with said occupancy level definitions.

18. The data flow control system of claim 10, wherein said data switch further comprises an intelligent control device, and wherein said means for determining input buffer occupancies further comprises:
- means for reading an input buffer occupancy value for each of said plurality of input sections;
- means for associating each of said input section buffer occupancy values with a buffer occupancy level; and
- means for assigning said occupancy levels to corresponding input sections.

\* \* \* \* \*